United States Patent [19]
Economy et al.

[11] Patent Number: 5,367,615
[45] Date of Patent: Nov. 22, 1994

[54] SPATIAL AUGMENTATION OF VERTICES AND CONTINUOUS LEVEL OF DETAIL TRANSITION FOR SMOOTHLY VARYING TERRAIN POLYGON DENSITY

[75] Inventors: Richard Economy, Ormond Beach; William A. Kelly, Port Orange; Anthony J. Pelham, Port Orange; Thomas A. Piazza, Port Orange; Lee T. Quick, Ormond Beach, all of Fla.

[73] Assignee: General Electric Company, King of Prussia, Pa.

[21] Appl. No.: 115,727

[22] Filed: Sep. 2, 1993

Related U.S. Application Data

[63] Continuation of Ser. No. 695,439, May 3, 1991, which is a continuation-in-part of Ser. No. 377,687, Jul. 10, 1989, abandoned.

[51] Int. Cl.$^5$ .............................................. G06F 15/62
[52] U.S. Cl. .................................... 395/129; 395/128; 395/123
[58] Field of Search ................................ 395/127–129, 395/123, 125, 141; 340/729

[56] References Cited

U.S. PATENT DOCUMENTS

| | | | |
|---|---|---|---|
| 4,291,380 | 9/1981 | Rohner | 364/522 |
| 4,646,251 | 2/1987 | Hayes et al. | 364/518 |
| 4,715,005 | 12/1987 | Heartz | 364/521 |
| 4,727,365 | 2/1988 | Bunker | 340/728 |
| 4,821,212 | 4/1989 | Heartz | 364/521 |
| 4,888,713 | 12/1989 | Falk | 364/522 |
| 4,912,659 | 3/1990 | Liang | 395/123 |
| 4,912,664 | 3/1990 | Weiss | 364/577 |
| 4,933,889 | 6/1990 | Meshkat | 364/578 |

OTHER PUBLICATIONS

Claris TM, MacDraw II ©, Gerard Schutten et al, Aug. 1988.
Computing Random Fields-8199 Computer Journal 29 (1986) Aug., No. 4, London, Great Britain N. E. Wiseman and S. Nedunuri.
Fournier et al, "Computer Rendering of Stochastic Models", Communications of the ACM, Jun. 1982, vol. 25, No. 6, pp. 371-384.
Mandelbrot, B., "Comment on Computer Rendering of Fractal Stochastic Models", Communications of the ACM, Aug. 1982, vol. 25, No. 8, pp. 581-584.
Musgrave et al, "Natura ex Machina", IEEE Computer Graphics & Applications, vol. 9, No. 1, Jan. 1989, pp. 4-7.

Primary Examiner—Mark K. Zimmerman
Assistant Examiner—Michael S. Smith
Attorney, Agent, or Firm—Geoffrey H. Krauss

[57] ABSTRACT

In a computer image generation system, the number of vertices which define each of a plurality of terrain-defining polygons is augmented in real time for providing finer detail and for effecting substantially continuous smooth level of detail (LOD) transition. Augmented vertices may have components that are statistically derived, in which case it is not necessary to store and/or predefine them. Alternatively, some vertex components may have predetermined values derived from mapping data or from other deterministic sources and may be stored in compact form. Processing polygons, typically triangles defined by selected ones of the sum of the augmented vertices and the original vertices, may be used for displaying the finer detail. Statistically derived finer detail is especially suited for providing non-specific detail to features such as terrain, while deterministic data allows highly accurate representations of specific 'real world' locations. The decision to augment vertices is controlled by a predetermined breakup criteria, which may be selected as one, or a combination of: range from the viewpoint; angle from the viewpoint boresight; desired maximum error; and other defined criteria.

20 Claims, 6 Drawing Sheets

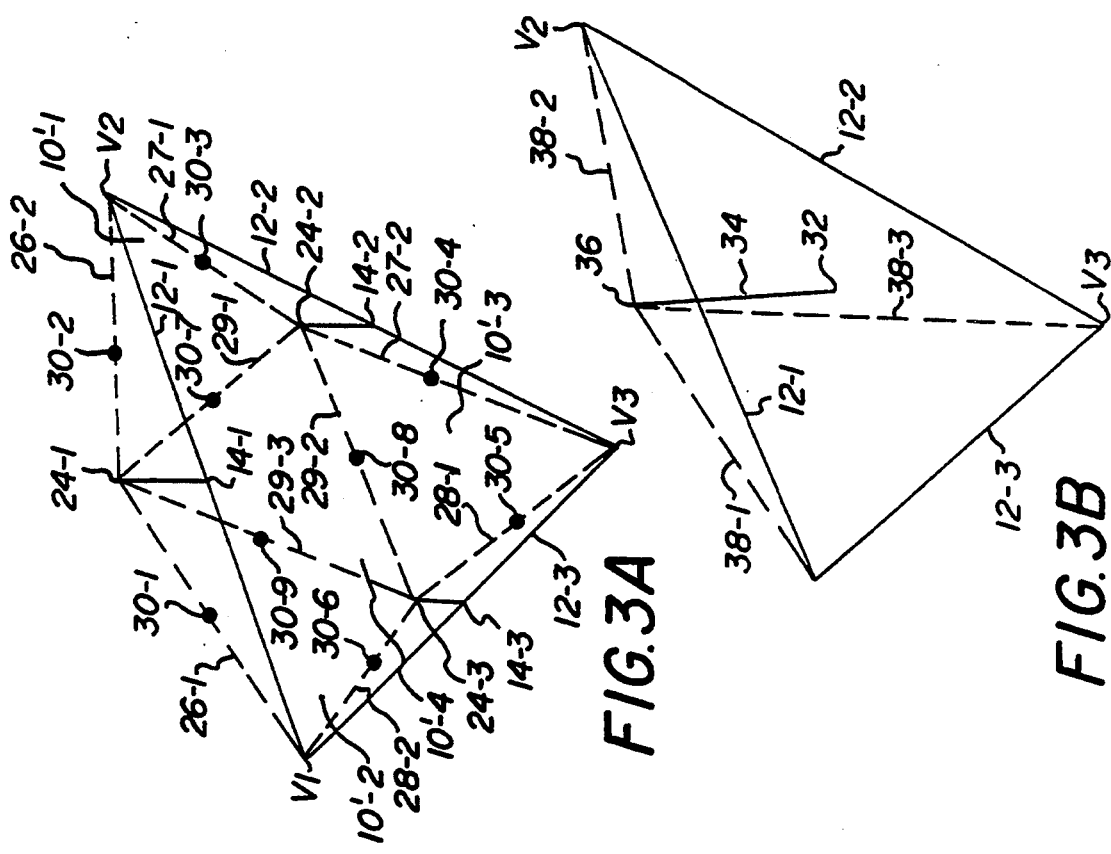
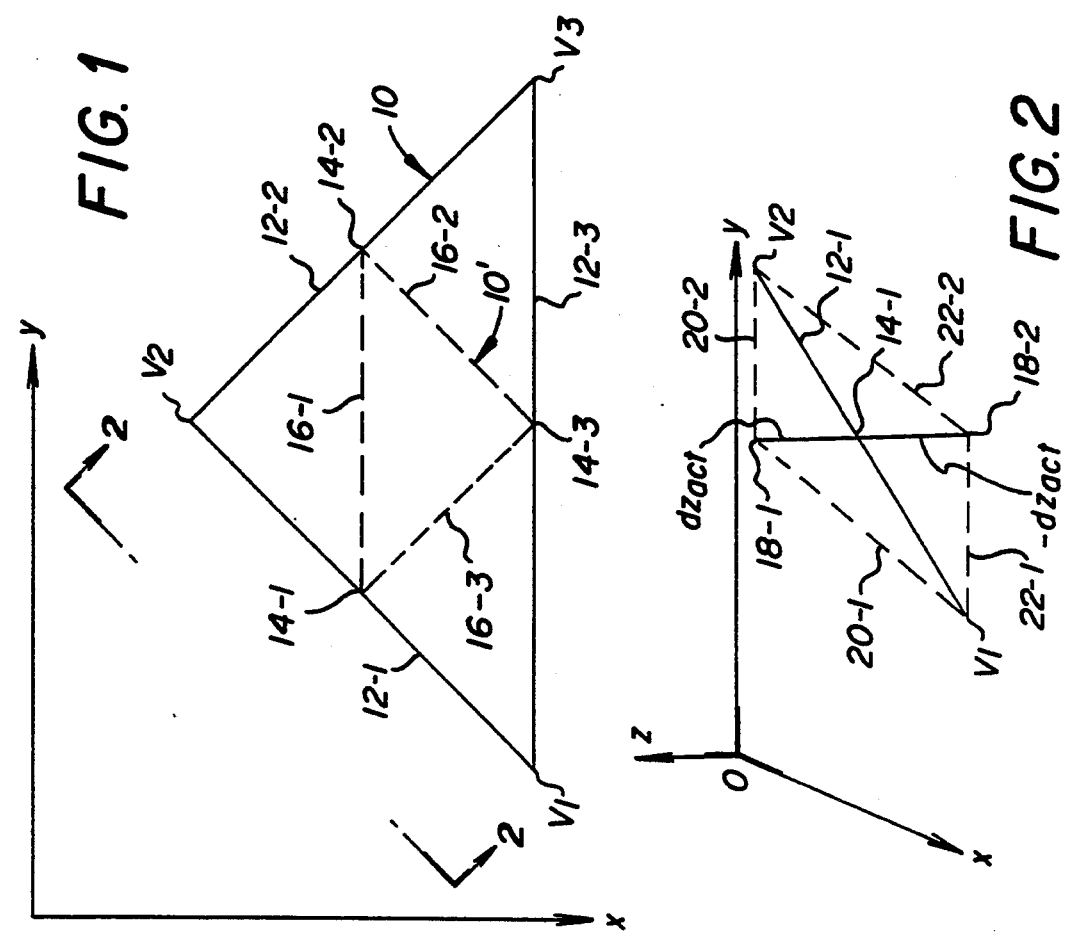

SPATIAL AUGMENTATION OF VERTICES AND CONTINUOUS LEVEL OF DETAIL TRANSITION FOR SMOOTHLY VARYING TERRAIN POLYGON DENSITY

This application is a continuation of application Ser. No. 07/695,439, filed May 3, 1991 which is a continuation-in-part of application Ser. No. 07/377,687, filed Jul. 10, 1989, now abandoned.

BACKGROUND OF THE INVENTION

This invention relates to computer image generation (CIG) and, more particularly, to a method for spatial augmentation of vertices with continuous level of detail transition for obtaining continuous smooth transformation between effective levels of polygon density, in part by creating new vertices in response to predetermined data descriptors.

Typically, objects to be displayed in a scene of a computer image generation (CIG) system are represented by edges of polygons, or faces, the vertex descriptors of which are stored in a data base. Some form of transition between different levels of detail (LODs) for representing objects to be displayed in CIG systems is also generally used. The use of different LODs enable objects that are more distant from a viewpoint to be represented by fewer polygons, thereby requiring fewer polygon edges to be processed and conserving computing resources for closer objects which typically require more detail and correspondingly more edges in order to be accurately and realistically represented. Transitions between LODs occur at respective predetermined ranges, or zones or regions, from a viewpoint with each lower, or more distant LOD, having correspondingly fewer edges assigned to corresponding features and therefore less detail for objects to be displayed.

In early CIG systems, transition from one LOD to another LOD occurred at respective predetermined ranges from a viewpoint and would be abrupt when the predetermined range was reached. Inasmuch as the human perception system is very sensitive to abrupt transition, this effect during image presentation was distracting and detracted from the goal of achieving realism.

The development of translucent face capability for CIG systems made possible a significant improvement in implementation of transitions between LODs. For example, in a system for generating an image of viewable terrain (i.e. features—both of natural nature, such as land, water, and the like, and of artificial nature, such as roads, structures and the like— of some environment, such as a location on or in the Earth, Space, the Sea, other planets, etc.), an LOD transition translucency control factor applicable to each LOD at the transition zone between adjacent LODs, and that monotonically increases from 0 to 1 (0 percent to 100 percent) at a predetermined rate in response to the change in range as an observer moves toward a scene can be used to control the translucency of faces from adjacent LODs. The translucency control factor determines the translucency of a face, from opaque at 0 to transparent at 1 with proportionate fractional values of translucency in between. At the proximate boundary of the transition zone the fine terrain faces of the lower detail LOD are opaque (control factor=0) and the fine terrain faces of the higher detail LOD are transparent (control factor=1). Continuing across the transition zone, a point is reached at which the coarse LOD faces have a translucency of x, say 25%, and the fine LOD faces have a translucency of (1−x), say 75%. In progressing through the transition zone, some point will be reached at which the coarse and fine LOD faces each have a translucency of 50%. At the remote boundary of the transition zone the fine LOD faces will be transparent and the coarse LOD faces will be opaque.

Although translucency blending during LOD transition is an improvement over abrupt switching of LOD information, there are still cases where translucency blending does not provide accurate and/or unambiguous results. For instance, if the fine LOD contains a peak of terrain that extends above the terrain of the coarse LOD and a feature, such as a vehicle, is spatially defined to be behind the peak of fine terrain, then at the 50—50 percent of translucency transition, the scene will show the feature as a blend of 50% feature definition (faces) and 50% terrain definition (faces), thus making the feature appear to be in front of the terrain even though spatially it was defined to be behind the terrain. This effect is known as bleedthrough.

In another example, it is sometimes requires to determine when a collision between objectives occurs. If, for example a vehicle is represented by faces with one percent translucency and a feature that is a potential target for a collision is represented by 99 percent translucency, then although the feature will not be visible to the observer, a collision between the vehicle and the feature will be detected.

Other potential deficiencies include inability to provide a face from either one LOD or the other that validly represents vehicle position and attitude at all points in the transition zone between LODs, and inefficiency in computer processing because all faces in the transition zone from both LODs must be processed to determine proper assignment of subpixel color and texture modulation for ultimate display.

It would be desirable to provide a method for overcoming position, attitude and collision ambiguities, bleedthrough effects, subpixel processing inefficiencies caused by having multiple polygon groups (one from each adjacent LOD) representing a single object, and other deficiencies that may be associated with prior CIG systems during LOD transitions. In addition it would be desirable to achieve smooth and continuous LOD transition without resort to translucency blending.

Accordingly, it is an object of the present invention to provide a method for smooth and continuous LOD transition for eliminating position, attitude and collision ambiguities, bleedthrough effects, subpixel processing inefficiencies caused by having multiple polygon groups representing a single object, and other deficiencies that may be associated with prior CIG systems caused by LOD transitions during image presentation.

Another object of the present invention is to provide a method for creating desired finer detail from predefined coarser data for effective continuous smooth LOD transitions.

Yet another object of the present invention is to provide a method for achieving smooth and continuous LOD transition without resort to translucency blending.

Still another object of the present invention is to provide a method for achieving smooth LOD transition by generating finer detail that is available from predefined data without having to predefine and/or store most of the finer detail.

SUMMARY OF THE INVENTION

In accordance with the present invention, in a computer image generation system, wherein features of an image to be displayed are represented by a plurality of polygons each having vertices designating end points of sides of the polygons, a method for augmenting the number of vertices so that finer detail for the features may be displayed while effecting continuous smooth level of detail transition, comprises: determining at least one breakpoint in each of at least one basis polygon selected from the plurality of image polygons; continuously modifying a geometrical attribute of the at least one breakpoint to form a derived vertex lying outside the plane of the basis polygon, while the basis polygon is within a preselected range of distances from an image viewpoint; selecting desired ones of the unmodified breakpoints and derived vertices to constitute an augmented number of vertices for the basis polygon; connecting the selected augmented vertices in a pre-determined direction to provide at least one derived polygon within the associated basis polygon; and processing the plurality of derived polygons for image generation so that finer detail for the features may be displayed while effecting continuous smooth level of detail transition.

The coordinates of breakpoints may be modified by continuously adding positive or negative deviation values, for changing deviation position example, as range from the image viewpoint changes. The deviation values may be constants, geospecific values, random values, periodically varying values including sinusoidal values or combinations thereof. Geospecific values are related to actual real world features such as are available from a source such as the Defense Mapping Agency. The position of the breakpoint along a side of the basis polygon may be a predetermined distance from an end point of the side. The predetermined distance may be a constant including one-half the length of the side for locating the breakpoint at the mid-point of the side, a random distance or combinations thereof.

Initial breakpoints may be predetermined and stored, but are retrieved and used only when the basis polygon is within a predetermined distance from the image viewpoint, inasmuch as finer detail is generally not required for remote objects. For each succeeding finer level of breakpoint determination to be enabled, the involved polygon (basis or derived) must move to within a corresponding closer predetermined distance from the viewpoint.

Other predetermined criteria such as the angle from view window boresight or error function may be used to determine when to identify breakpoints. The view window boresight is along a line or vector through the viewpoint and perpendicular to the view window. A view ray is a line or vector through the view point and view window to a point in the image of the scene. Finer detail is generally not required in peripheral regions for systems that employ a head-tracked technique such as an area-of-interest display. Also, finer detail may be required when the error function value from a predetermined desired value exceeds a threshold value.

In another aspect of the present invention, a method for achieving smooth level of detail transition comprises dividing at least some of the polygons into smaller polygons, with each smaller polygon having a second vertex at each juncture of two of its sides, and determining third vertices respectively associated with a respective one of the second vertices, wherein at least one of the third vertices lies outside the plane of the polygon which includes the second vertex associated with the one of that third vertices, and processing the polygon defined by third vertices (including the at least one of the third vertices) for image display, thereby achieving smooth level of detail transition.

In yet another aspect of the present invention, a point lying within a basis polygon is determined, the point is modified to form a derived vertex and a derived polygon, formed by connecting the derived vertex to at least two vertices of the basis polygon, is processed to provide fine detail. The same number of derived polygons as there are sides of the basis polygon may be formed by connecting the derived vertex to each vertex of the basis polygon.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

BRIEF DESCRIPTION OF THE DRAWINGS

FIG. 1 is a plan view of a basis polygon subdivided for use in one part of the present invention.

FIG. 2 is a representative edge of the polygon of FIG. 1 looking in the direction of the arrows of line 2—2 referenced to an xyz orthogonal axis system and including a deviation factor for forming additional vertices in accordance with one aspect of the present invention.

FIGS. 3A and 3B are a perspective view of the basis polygon of FIG. 1 showing derived vertices in accordance with the present invention.

DETAILED DESCRIPTION OF A PRESENTLY PREFERRED EMBODIMENT

Figure 4:
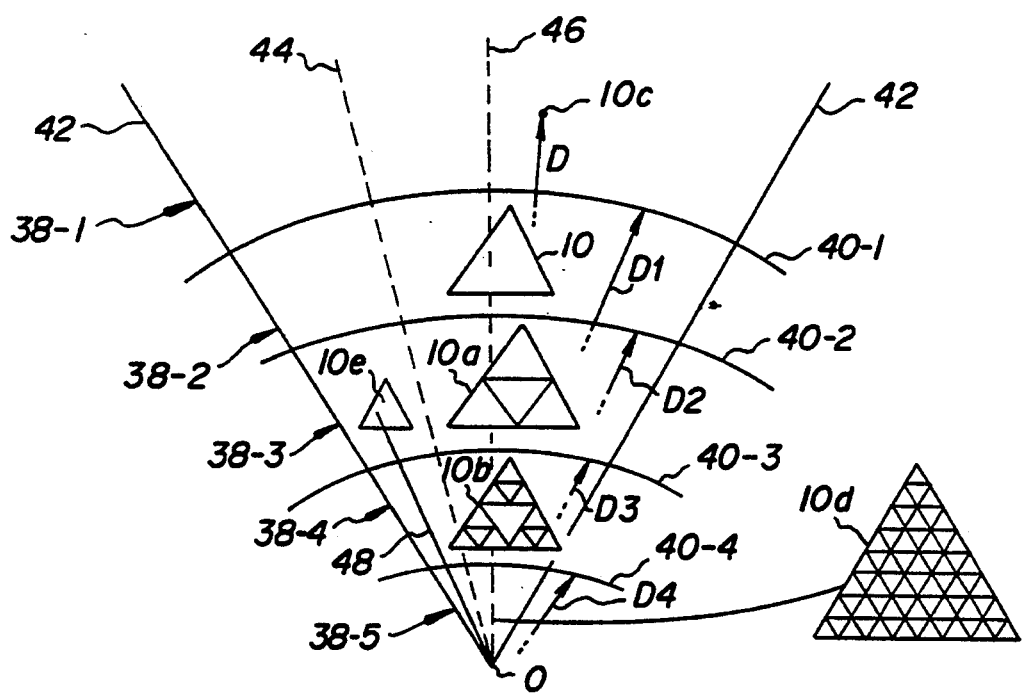
FIG. 4 is a schematic diagram of the basis polygon of FIG. 1 subdivided in response to predetermined ranges from a viewpoint in accordance with another aspect of the present invention.

Initially referring to FIG. 1, a basis polygon 10, represented as a triangle, includes vertices $V_1$, $V_2$ and $V_3$. Polygon 10, including edges 12-1, 12-2 and 12-3 thereof, is used to define features of a scene or image to be displayed by a system. Spatial orthogonal three-axis system polygon descriptors, typically referenced to an orthogonal three-axis global system, are stored in a data base having a bulk storage medium, such as magnetic tape or disk. Generally, the polygon descriptors include x, y, z components of the vertices, along with other information such as color, texture and translucency for each polygon.

Basis polygon 10 may be considered as a polygon of the lowest or least detailed LOD. Polygon 10 (which may be a right, acute or obtuse triangle of scalene or isoseles form) includes a first side 12-1 extending between vertices $V_1$ and $V_2$, a second side 12-2 extending between vertices $V_2$ and $V_3$, and a third side 12-3 extending between vertices $V_1$ and $V_3$. A breakpoint 14 can be defined for each edge 12; breakpoints 14-1, 14-2, and 14-3 may be the mid-points of sides 12-1, 12-2 and 12-3, respectively, or may be at a predetermined fixed or random distance from a respective vertex in a clockwise or counterclockwise direction around polygon 10. That is, for a clockwise direction around polygon 10, breakpoint 14-1 may be determined with respect to $V_1$, breakpoint 14-2 with respect to $V_2$ and breakpoint 14-3 with respect to $V_3$.

Also shown for reference in FIG. 1 are the x and y axes of an orthogonal three-axis coordinate system with the origin at 0. The third or z-axis is perpendicular to the figure at origin 0 and is shown in FIG. 2. The x, y and z coordinates of vertices $V_1$, $V_2$ and $V_3$, from which the x, y and z coordinates of breakpoints 14-1, 14-2 and 14-3 are readily determinable, are available from a data base 60 (FIG. 5) which stores this information after the breakpoints are determined by off-line computation in accordance with any selected criteria; the selection of such criteria (e.g. minimized actual deviation error) and the manner of calculation and storage of errors and/or breakpoints, is known to the art and is not a portion of the present invention. The calculation of a breakpoint 14 is in accord with the geometric weighting of the vertices forming the edge 12 involved; for example, when breakpoint 14-1 constitutes the midpoint of side 12-1, then the x, y and z coordinates of breakpoint 14-1 are the average of the sum of the respective x, y and z coordinates of vertices $V_1$ and $V_2$, which are also the end points of side 12-1 of polygon 10 on which breakpoint 14-1 lies. The x, y and z coordinates for breakpoints 14-2 and 14-3 may likewise be determined from the coordinates of $V_2$ and $V_3$ for break:point 14-2, and from the coordinates of $V_3$ and $V_1$ for breakpoint 14-3. When a breakpoint is not the mid-point of a side of a polygon, the coordinates of the breakpoint may be readily determined from the coordinates of the vertices of the end points of the side on which the breakpoint lies and the weighting function setting the distance of the breakpoint from one of the vertices, using basic algebra, trigonometry and/or analytic geometry. Such processing may include, for example, well-known algorithms programming a general purpose computer for determining the equation of a line (side) in three dimensions from the coordinates of the end points (vertices) of the line, and then determining the coordinates of a point (breakpoint) on the: line (side) that is disposed at a predetermined distance from one of the end points (vertices) of the line (side).

In FIG. 1, the breakpoints 14-1, 14-2 and 14-3 are additional vertices augmenting the original polygon vertices $V_1$, $V_2$ and $V_3$, and a finer LOD is represented by the smaller polygon 10' formed by edges 16-1, 16-2 and 16-3 formed when the totality of original and augmented vertices 12 and 14 are interconnected by a series of dashed lines 16-1, 16-2 and 16-3, here, starting at one breakpoint and proceeding in a clockwise or counterclockwise direction until the new closed polygon 16, contained within the original polygon 10, is obtained. Thus, a breakpoint $Vb = V_m + K(V_n - V_m)$ can be found at a distance ratio O'K<1, between a first vertex $V_m$ and a second vertex $V_n$ along any edge.

Referring to FIG. 2, a view looking in the direction of the arrows of line 2-2 of FIG. 1 is shown. For convenience and to avoid undue repetition and clutter, only side 12-1 and treatment of breakpoint 14-1 is shown, it being understood that other breakpoints may be treated analogously. A deviation or perturbation value $dz_{act}$ is added ($+dz_{act}$) or subtracted ($-dz_{act}$) from the z coordinate value of breakpoint 14-1 to form a derived vertex 18-1 when $dz_{act}$ is added to, or a derived vertex 18-2 when $dz_{act}$ is subtracted from, the z coordinate value of breakpoint 14-1. In the example shown, only the z coordinate of breakpoint 14-1 is modified, it being recognizable by one of ordinary skill in the art that any combination of permutation or modifications to the x, y and z components of each breakpoint independent of the modifications applied to each other breakpoint may be performed as desired in accordance with the teachings of the present invention for forming derived vertices. Thus, vertices 18-1 and 18-2 have the same x and y components as does breakpoint 14-1 with the z component modified by the value of $dz_{act}$.

The value of $dz_{act}$ may be determined in accordance with the following equation:

$$dz_{act} = dz_{tlu} * K_{rz} * K_{SZ},$$

wherein $dz_{tlu}$ is a base deviation value that may be obtained from a table look-up, $K_{rz}$ is a convergence factor having a value from 0 to 1 that varies continuously as a function of the breakup criteria (which may be, for example, the range distance from the viewpoint 0, as long as the range is within a predefined range zone) and $K_{SZ}$ is a scaling factor that ensures that the value of $dz_{act}$ does not exceed the value of maximum deviation $dz_{max}$. The value of $dz_{max}$ may be determined in response to the length of the side of a polygon, upon which side the breakpoint being modified is situated for ensuring that the value of $dz_{act}$ presents an acceptable image when displayed, as may be determined by one of ordinary skill in the art without undue experimentation. Scaling factor $K_{SZ}$ is only required when $dz_{tlu}$ is a random deviation and may be set equal to one for all other cases. The value of $dz_{act}$ may be zero. For example, if polygon 10 abuts a cultural feature such as a road, building, and the like, then it may be desirable to supply a deviation $dz_{act}$ of zero to one or more breakpoints to avoid break-up of the cultural feature.

Inasmuch as the z-axis is generally defined to be vertical with the x and y axes perpendicular thereto and to each other as well, a vertex created by the addition of $dz_{act}$ to the z coordinate of a breakpoint may be used to represent changes in elevation above a nominal elevation, such as rolling terrain, hills and valleys, while a vertex created by the subtraction of $dz_{act}$ from the z coordinate of a breakpoint may be used to represent relief in the terrain, such as a depression or crater.

It is noted that regardless of whether the value of $dz_{act}$ is added to, or subtracted from, the z component of breakpoint 14-1, new vertex 18-1 or 18-2 and two new superior edges 20-1 and 20-2, or two new inferior edges 22-1 and 22-2, respectively, as indicated by dashed lines from new vertex 18-1 or 18-2 to the end points $V_1$ and $V_2$ of edge 12 are obtained without having been previously defined or stored (i.e with only information for determining the augmentive vertex 14-1 and the offset deviation $dz_{act}$ being predetermined and stored). Further, it is possible to determine the coordinate values of new vertices 18-1 or 18-2 in real time, thereby facilitating image generation. Adding $dz_{act}$ to the z component of breakpoint 14-1 also removes the derived polygon 10' (as determined by breakpoints 14-1, 14-2 and 14-3 in FIG. 1) from the plane of basis polygon 10.

Although the present invention may be beneficially applied to features that generally do not require specific detail definition, such as terrain and bodies of water, it may be used to generate non-specific fine detail wherever such fine detail may be required or desired, without having to have previously determined or stored the fine detail when statistical data such as random or pseudo-random deviations are used. In addition, deterministic data, that is data representing a specific or generic feature such as mountains, valleys and forests but not necessarily any particular real world feature, can be used to represent highly accurate images of the features. Another benefit of the present invention is that as the field of view changes, the fine detail that is generated in accordance with the present invention may be discarded without storing when the feature falls outside the field of view and may be later recreated should the feature again come within the field of view.

The potential values for $dz_{tlu}$ may be determined and stored in a table look-up to be accessed by a code that is associated with each edge of basis polygon 10 (FIG. 1) and that is stored in the data base. If actual or deterministic data are used then some but not all data must be stored in the data base, such as elevation (z) but not x and y data which may be calculated. The code ensures that the same address is always selected for the edge. According to the type of terrain or feature being simulated, the value of each $dz_{tlu}$ may be: a random or pseudo-random value; a predetermined constant; derived from real data, such as Defense Mapping Agency data; periodically changing, such as a sinusoidal function, for simulating, for example, waves in a body of water. More important than the actual source of values for $dz_{tlu}$ is that the image ultimately displayed appear to be realistic. It is well within the ability of one of ordinary skill in the art to select the type of deviation and values for $dz_{tlu}$ that are suited for specific applications in accordance with the teachings of the present invention.

Referring to FIG. 3A, a perspective view of basis polygon 10 of FIG. 1 is shown. Polygon 10 has derived vertices determined in accordance with the present invention. Respective derived vertices 24-1, 24-2 and 24-3 correspond to breakpoints 14-1, 14-2 and 14-3, respectively, with respective (+) deviation values added to the z-components thereof, in accordance with some predetermined height (z) determining algorithm. It will be understood that the deviation value at each derived augmentation vertex can as easily be a (−) deviation, but all deviations are shown as positive in the figures for clarity and ease of interpretation.

New edges 26-1 and 26-2 from derived vertex 24-1, new edges 27-1 and 27-2 from derived vertex 24-2, and new edges 28-1 and 28-2 from derived vertex 24-3 are indicated by dashed lines from the corresponding derived vertex to the end points of the side of basis polygon 10 on which the breakpoint corresponding to the derived vertex lies. Derived vertices 24-1, 24-2 and 24-3 are shown interconnected in a clockwise or counterclockwise direction starting with one of the derived vertices by dashed lines 29-1, 29-2 and 29-3 that form the sides of a closed derived polygon 10' having vertices 24-1, 24-2 and 24-3. Inasmuch as the coordinates of the derived vertices are known, each of four derivative polygons 10' are defined: a first smaller triangular polygon 10'-1 is defined by vertex triples $V_2$, 24-1 and 24-2; a second polygon 10'-2 is defined by vertex triple $V_1$, 24-1 and 24-3; a third polygon 10'-3 is defined by the triple vertices $V_3$, 24-2 and 24-3; and a fourth (central) polygon 10'-4 is defined by the set of three vertices 24-1, 24-2 and 24-3. This set of four smaller polygons may be processed for forming an image portion of finer detail than is available from basis polygon 10 for visual images. Such processing is analogous to processing which occurs for polygon descriptors that are obtained from the data base.

If desired, the derivative and derived polygons of FIG. 3A may be further subdivided for obtaining even finer detail. For instance, one of breakpoints 30-1 through 30-9 may be respectively provided at locations as indicated on a respective one of sides 26-1, 26-1, 27-1, 27-2, 28-1, 28-2, 29-1, 29-2 or 29-3 of one of the derivative polygons. Breakpoints may be similarly located on the sides of the other derivative and derived polygons and processing analogous to that used for the initial derived polygon obtained from basis polygon 10 may be employed to even further extend the finer and finer LOD graduations.

Referring to FIG. 3B, another embodiment for augmenting vertices in accordance with the present invention is shown. Point 32 represents a point lying within, or on an edge of, basis polygon 10. A deviation value 34 is combined with coordinate component values of point 32 for locating a derived vertex 36 lying outside the plane of basis polygon 10. Derived vertex 36 is shown connected to each vertex $V_1$, $V_2$ and $V_3$ of basis polygon 10 by dashed lines 38-1, 38-2 and 38-3, respectively. Derivative polygons described by vertex triples $V_1$, $V_2$, 36; $V_2$, $V_3$, 36 and $V_3$, $V_1$, 36 may be processed for generating finer detail that is available from processing basis polygon 10. It is noted that when derived vertex 36 is connected to each vertex $V_1$, $V_2$ and $V_3$ of basis polygon 10 the number of derivative polygons is equal to the number of sides of polygon 10.

Referring to FIG. 4, a schematic diagram (not necessarily to scale) is shown with basis polygon 10 being subdivided to increase the viewable LOD in response to the basis polygon 10 leaving a farthest range zone 38-1, beyond a predetermined range circle, or ring, 40-1, and entering each successively closer zone 38-2 through 38-5, between predetermined range circles 40-1/40-2, 40-2/40-3, 40-3/40-4 or within the range circle 40-4 closest to viewpoint 0 at the center of concentric circular range rings 40. Thus, each range ring 40 is disposed at a respective greater predetermined distance from viewpoint 0. The field of view (FOV) is represented by the smaller angle subtended by the margins 42 of the FOV. While range is shown here for ease of illustration, other criteria (such as |error|/range) can be equally as well utilized.

Basis polygon 10 is shown disposed between range rings 40-1 and 40-2. As a point 10c, representing a chosen point (e.g. the centrum, the leading edge center, the leading vertex and the like) on the basis polygon 10 moves toward viewpoint 0 and/or viewpoint 0 moves toward basis polygon point 10c so that the relative position between basis polygon point 10c and viewpoint 0 changes, the distance D therebetween is continuously compared to the distances between the range circles next-nearer and next-further away from the viewpoint. Thus, when polygon 10 is at a distance D>D1 (i.e. beyond circle 40-1) the polygon may be compressed to have dimensions sufficiently small so as to be considered a point 10c and not be visible (although still present and considered by the CIG system calculations). As the distance D decreases, the first range circle 40-1 is approached and a flat basis polygon 10 appears once D=D1 and circle 40-1 is crossed. As the polygon 10 moves inwardly toward viewpoint 0 and distance D decreases, between range circle 40-1 and range circle 40-2, basis polygon 10 remains viewable only as a flat polygon, because the next more complex LOD is not required (by preselected criteria) until D=D2 and polygon 10 reaches range ring 40-2. Once the distance comparison shows that range ring 40-2 is reached, the off-line-determined breakpoint criteria and deviation information are input from data storage and are used to determine the edge breakpoints (e.g. the set of "coarser" breakpoints 14) needed to generate the more-complex LOD polygon 10a, with its additional detail, as may be required by a first set of breakup criteria for basis polygon 10. As the distance between the augmented polygon 10 and viewpoint 0 is further reduced, the deviation at the mid-edge breakpoints is continuously varied in accordance with a preselected function (generally, from a substantially zero deviation at the farther ring to a substantially full deviation when the augmented polygon reaches the nearer ring). Additionally, as the polygon 10a moves toward viewpoint 0, so that the polygon 10a crosses the next-nearer range ring 40-3 (when D=D3), additional augmentation is utilized to generate the next set of breakpoints (e.g. the set of finer breakpoints 30 is enabled) and the associated deviation criteria is used to provide an even-finer detailed polygon 10b with substantially continuously varying deviation, and therefore LOD and polygon density, in the region between range rings 40-3 and 40-4. Even more additional detail is provided, by determining a third set of breakpoints (and associated elevation deviation criteria) for the subpolygons of a finest-LOD polygon 10d, created in the second set of derived vertices in polygon 10b. The process of locating breakpoints and creating new vertices for augmenting the number of predetermined vertices available in a CIG system may be repeated as desired. Creation of additional scene detail in accordance with the present invention provides continuous transition between LODs without resort to blending so that only one group of polygons is processed, thereby avoiding ambiguities and inefficiencies previously referred to.

However, even if desired, it may not be economical from the standpoint of allocating limited computing resources to generate such finer detail. For instance, if an object is beyond a predetermined distance from the viewpoint, the finer detail will not be viewable to an observer and there is no need to generate it. Thus, before finer detail is generated, each polygon may be tested to determine if it lies within a predetermined functional range from viewpoint 0. If the tested polygon lies within the functional range, then at least one level of finer detail is allowed to be generated. For each additional level of breakup and resultant finer detail, the tested polygon must be within an additional closer range zone to viewpoint. Thus, if polygon 10e is in a region of the viewfield at an angular orientation beyond some limit line 44, with respect to the FOV center line 46, the basis polygon (and its inherent coarser LOD) is retained, even though the distance criteria for next-LOD (i.e. D of distance line 48 is less than D2) is met. In the alternative, an error function interval, such as one for elevation, may be used to determine when additional finer detail is required permitted. A source of terrain data, such as the Defense Mapping Agency (DMA), supplies data covering large areas having the elevation thereof specified over a predetermined rectangular grid, typically having a spacing of 100 meters between elevation posts. It may be desired to have the elevation of the feature being displayed within a predetermined limit, or error functional interval, from the actual elevation provided by the source of data. If the displayed elevation exceeds the error limit or falls outside the error interval then finer detail may be generated.

Another alternative, regardless of the source of data, is to increase tee amount of detail within the scene with a decrease in the angle between view window boresight 46 and the view ray 48 to a predetermined point, such as the centroid, of basis polygon 10. Fine detail may be generated only when the angle between view window boresight 46 and view ray 48 is less than a predetermined threshold value. This would permit efficient use of computing resources when a system such as an eye-tracked area of interest display is used. As illustrated in FIG. 4, basis polygon 10 that is intersected by view ray 48 is disposed in the peripheral region outside threshold angular limit value 44 and thus is not subdivided even though it would be subdivided if a range test would be used. A combination of sub-dividing criteria may be used for determining when subdivision of basis polygon 10 is appropriate.

Convergence factor $K_r$ is used to moderate the introduction of additional detail so that the additional detail is gradually introduced into the scene as the range between viewpoint and basis polygon 10 changes to avoid a sudden appearance of additional detail into a scene.

Figure 4A:
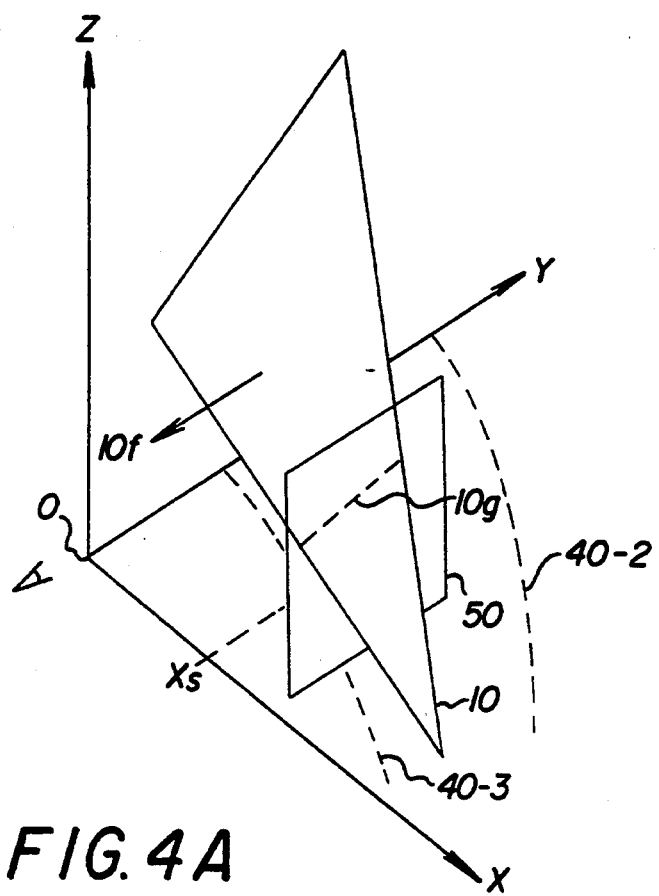
FIG. 4A is a prospective view of one polygon, illustrating certain aspects of conventions for viewing additional vertex formation and continuous LOD transition, in accordance with aspects of the present invention.
Figure 4B:
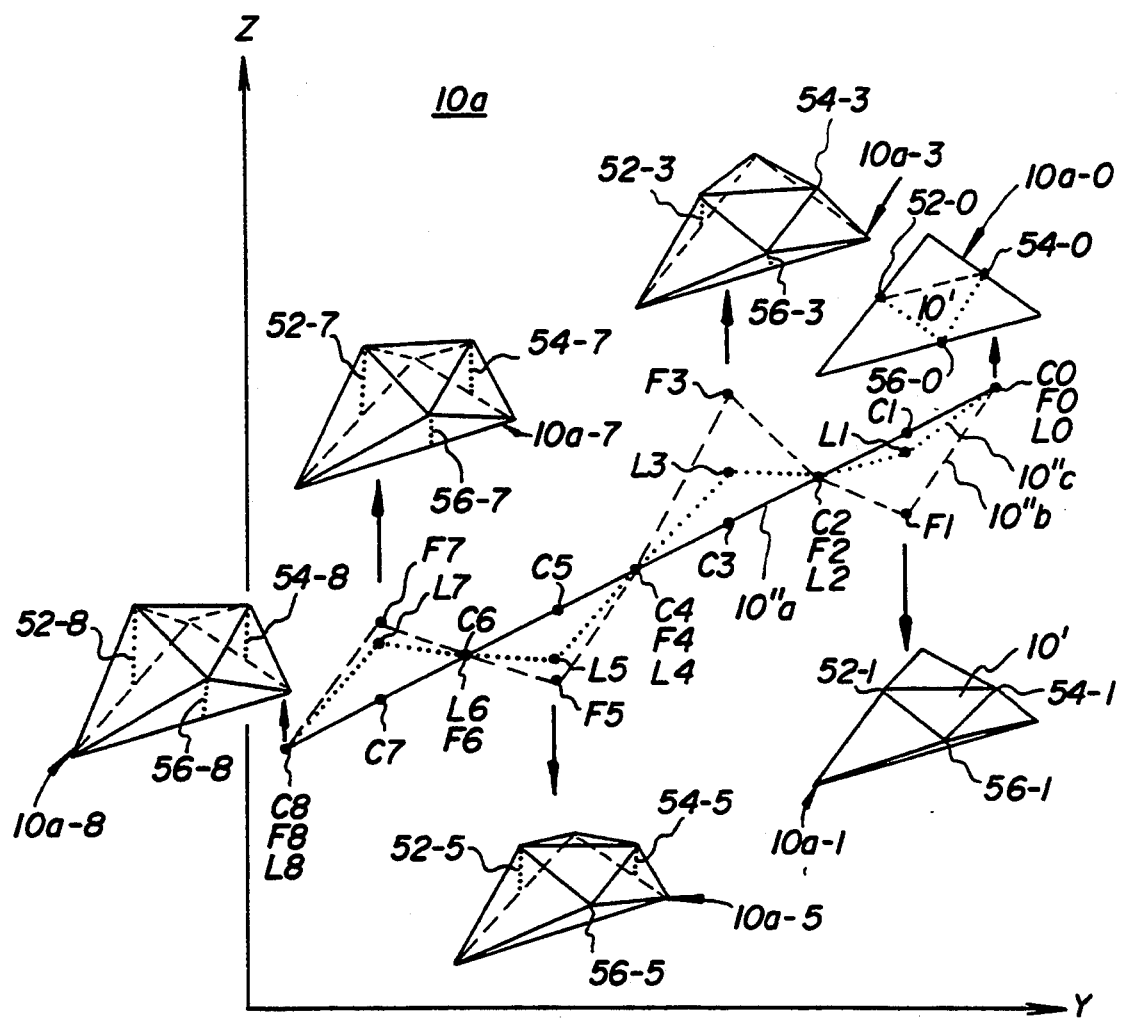
FIG. 4B is a graph of, and auxiliary views of one basis polygon undergoing vertex augmentation in a continuous and smooth LOD transition across a range zone from a coarser LOD limit to a finer LOD limit, in accordance with the present invention.

The result of our novel continuous LOD augmentation method can be seen by reference to FIGS. 4A and 4B. In FIG. 4A, the terrain-basis polygon 10 is moving in the direction of arrow 10f toward viewpoint 0; we consider the shape/complexity of a line 10g along the surface of the polygon, in a plane 50, parallel to the Y-Z plane and at some selected X axis value $X_s$. As we go from right to left in the scene, there is a transition from lower LOD to higher LOD. It will be understood by those skilled in the display arts that the actual spatial location of any point on an augmented polygon will, as the point is moved with respect to the viewpoint, be describable by a four-dimensional curve in the volume-time continuum; any rendering thereof in a two-dimensional plane (i.e. a flat drawing sheet) is, of necessity, but a mere projection of the actual changes occurring. With the foregoing in mind, the activity of the polygon 10a, in region 38-3, is illustrated in FIG. 4B.

The line 10g describing the location of a point on the polygon surface is not static, but changes in complexity as the level of detail changes in the various zones 38 of the image. At a farther end of the zone (illustrated by range ring 40-2) only a coarser LOD is present, while at a near zone end (illustrated by range ring 40-3) only a finer LOD is present; in between the zone limits (e.g. between rings 40-2 and 40-3) the LOD is a blend of the two, with a complementary percentage of one LOD to the other. Thus, at the middle of an LOD zone, the polygon has altitude characteristics determined by an average of the finer details and the coarser details. The coarser LOD would provide points C0–C8 along a straight line 10″a as the polygon point moves from ring 40-2 to ring 40-3, as this line is the plane of the flat polygon 10 with constant coarse detail (i.e. with a simple z=ay+b equation for finding the altitude z at any y location, such as at the indicated eight points of 0%, 12.5%, 25%, ..., 100% between rings 40-2 and 40-3). A constant finer detail, as might be found at ring 40-3, is provided by the curve 10″b, with points F0–F8; this curve is a piecewise-linear approximation to the added detail resolvable in the augmented planes of a polygon at the next level of detail. For purposes of simplification, the finer detail 0%, 25%, 50%, 75% and 100% points F0, F2, F4, F6 and F8, respectively, are of the same Z altitude as the coarser detail profile at the same points; note, however the altitude differences at points F1, F3, F5 and F7 of fine-detail-curve 10″b. In accordance with one aspect of the present invention, the actual Z altitude of a point L0–L8 is obtained by the product of the fractional relative distance of the point from the zone ends and the finer/coarser deviations at the particular point being considered. Thus, the Z-axis actual elevation E=(P*F)+z, where P is the percentage of finer LOD to be included at the distance D, with P=(100-y)% and y=(D-D8)/(D0-D8) where D8 is the distance of the nearer range ring and D0 is the distance of the farther range ring, F is the finer LOD point elevation at distance D and z is the basis polygon height z=ay+b, with b equal to the Z value at point C8, and a=(C0-C8)/(D0-D8).

By way of example, consider the continuous LOD transition shown in FIG. 4B: as the distance between the polygon and the viewpoint decreases, the flat planar polygon 10 arrives at ring 40-2 (at distance D0) from beyond the ring (i.e. slides in from the right-hand side of the figure). The edge breakpoints have not been previously considered, as the distance D was greater than the range circle distance D0; now, the distance comparison test enables the edge breakpoints and data as to the three breakpoints is available in the geometry processor of the CIG system. At y=D0, both the fine and coarse LODs have the same altitude C0=F0=L0, where L0 is the continuous-LOD level thereat. Said somewhat differently, at this distance the coarse LOD percentage is 100%, and the complementary fine LOD percentage is 0%, so that, while the edge breakpoints exist, the respective deviation 52-0, 54-0 or 56-0 at the associated breakpoint is zero, which is the L0 level of that polygon. The augmented interior triangle 10′ is not actually visible here, as the derived polygon 10′ and the basis polygon 10 are co-planar.

The actual deviation increases as the polygon moves closer to the viewpoint, say to a first location which is one-eighth of the distance between the rings, whereat the finer LOD now will contribute a corresponding percentage, say ⅛ or 12.5% of the deviation and the coarser LOD will contribute ⅞ or 87.5%, so that the total deviation curve 10″c has a first point L1 which is at one-eighth of the deviation of finer LOD point F1 from coarser LOD point C1. Thus, the breakpoint deviations 52-1, 54-1 and 56-1 have 12.5% of their full F1 values and are not of zero dimension any longer, so that the derived polygon 10′ is no longer coplanar with the basis polygon and the augmented polygon 10a-1 at position L1 shows increased LOD over the flat polygon 10 at position L0. It will now be seen that the amount of breakpoint deviation 52-p, 54-p and 56-p, at each location Lp, where p is continuously variable from the outer ring to the inner ring of a range zone, will be set by the finer LOD percentage, responsive to the distance of penetration into the LOD zone. Thus, at location L3, which is ⅜ or 37.5% into the zone, the deviations 52-3, 54-3 and 56-3 are each 0.375 of the finer LOD deviations F3 at the corresponding breakpoints. Similarly, at location L5, which is ⅝ or 62.5% into the zone, the deviations 52-5, 54-5 and 56-5 are each 0.625 times the finer LOD deviations F5 at those corresponding breakpoints, while at location L7, which is ⅞ or 87.5% into the zone, the deviations 52-7, 54-7 and 56-7 are each 0.875 times the corresponding breakpoint finer LOD deviations F7. It will be understood that this example used several specific locations for the purposes of illustration and that, in reality, the breakpoint deviations are substantially continuously and smoothly varied as the polygon 10 is moved from one range circle, where the higher LOD level is enabled, to the next-higher range circle, where an even-higher LOD level is provided by enablement of new breakpoints and the continuous addition of new elevation deviations thereat, at the viewpoint-polygon distance varies.

Figure 4C:
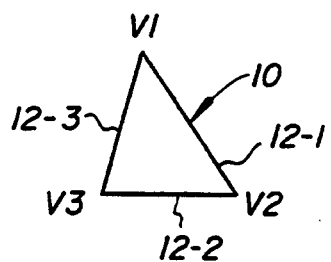
FIGS. 4C(a)–4C(l) is a set of triangular basis polygons, illustrating all possible augmentations producible by the present invention.
Figure 4C:
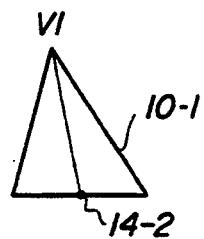
Figure 4C:
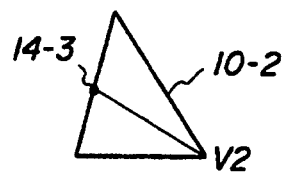
Figure 4C:
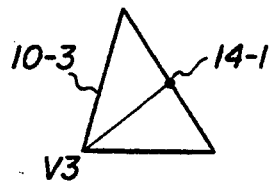
Figure 4C:
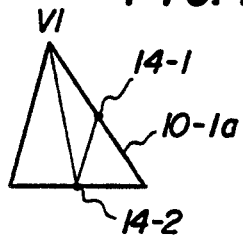
Figure 4C:
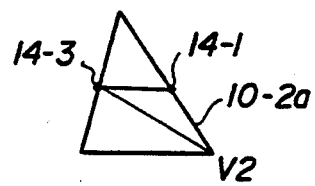
Figure 4C:
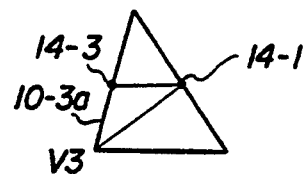
Figure 4C:
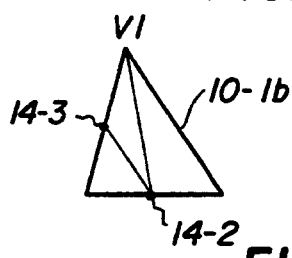
Figure 4C:
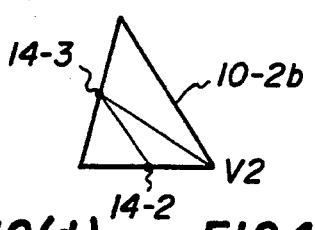
Figure 4C:
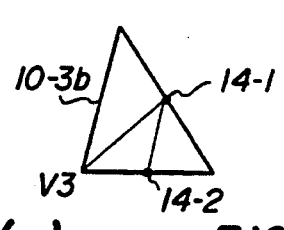
Figure 4C:
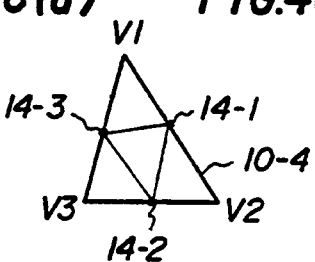
Figure 4C:
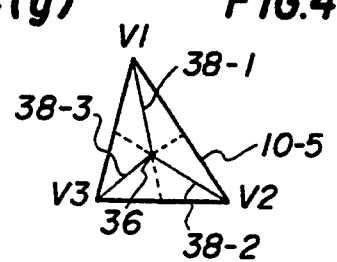

Referring now to FIG. 4C, it is not necessary that the lower LOD polygon 10 be transitioned only to a single form of more-complex and finer LOD augmented polygon, such as the quadripart augmented polygon 10-4 or the central-breakpoint augmented tripart polygon 10-5. It is equally valid in augmentation to partition the basis polygon into two parts, as in augmented bipart polygons 10-1, 10-2 or 10-3, or into other forms of augmented tripart polygons 10-1a, 10-1b, 10-2a, 10-2b, 10-3a or 10-3b. It is not even necessary to use only one or a small number of these forms in a single CIG system. Each different basis polygon in a scene may be assigned a different form of finer LOD augmented polygon, and the finer LOD augmented polygons may themselves be augmented by other forms, as required, when even further augmentation is enable, as the polygon-viewpoint distance is decreased. The determination of which augmentation form to use for a particular polygon is typically made by a separate database-generation system, which is operated non-real time and off-line (i.e. performs its operations independently and merely supplies its output to the CIG system as stored data, including data for breakpoint determination at various viewpoint distance criteria, or breakup criteria, and deviations to be called into use when needed).

Figure 5:
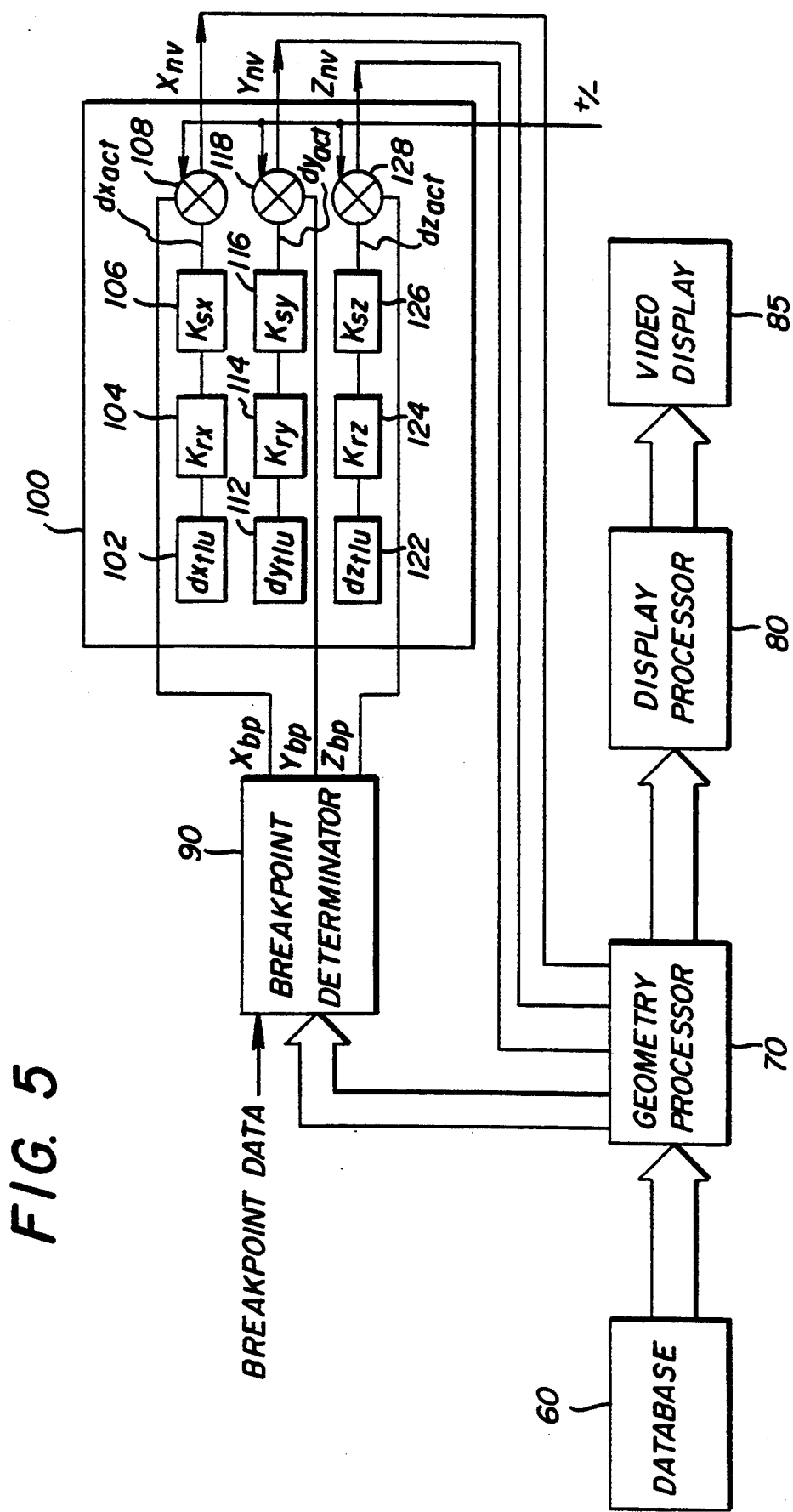
FIG. 5 is a hardware block diagram in accordance with the present invention.

Referring to FIG. 5, a hardware block diagram in accordance with the present invention is shown. A data base 60 has a digital data output connected to a data input of a geometry processor 70 for supplying three-dimensional polygon descriptors as the input data words. Processor 70 includes a data output connected to an input of digital display processor 80 for receiving two-dimensional digital polygon descriptors from data processor 70. A digital data output of display processor 80 is connected to a video data display 85 for supplying fully processed data that is ultimately displayed by video display 85. Detailed description of the operation of these components may be had by reference to U.S. Pat. Nos. 4,811,245—Bunker et al. and 4,825,391—Merz which are assigned to the instant assignee and are incorporated in their entirety herein by reference thereto.

Another digital data output of geometry processor 70 is connected to a data input of breakpoint determinator circuitry 90 for receiving polygon descriptor digital data, while the data outputs of breakpoint determinator circuitry 90 are connected to data inputs of deviation circuitry 100, which operates upon the input digital data to output digital breakpoint data. Deviation circuitry 100 has outputs respectively connected for providing this deviation data to other inputs of geometry processor 70. The deviation data, which include coordinates of new vertices as determined in accordance with the present invention, are processed by the geometry processor in manner analogously to the data processing of information regarding polygon vertices that is received as pars of the polygon descriptor data from data base 60.

Another input of breakpoint determinator 90 is connected for receiving breakpoint data. Breakpoint data include information regarding the location of a breakpoint on an edge of a polygon with respect to a vertex of the polygon. For example, breakpoint data may include information that the breakpoint is m be: the midpoint of the edge; a random distance from the vertex; a periodically varying (like sinusoidal) distance from the vertex; or other function that may be provided, perhaps by operator input.

Deviation circuitry 100, a deviation function selector 102, first scaling means 104, second scaling means 106 and combiner means 108 are connected in series for supplying deviation factor $dx_{act}$ data to combiner means 108. First and second scaling means 104 and 106 scale the value of the signal provided thereto, such as by multiplying by the constants $K_{rx}$ and $K_{sx}$, respectively. Also supplied from an output of breakpoint determinator 90 to combiner means 108 is the coordinate value $X_{bp}$ data of the x-coordinate of the breakpoint as determined by breakpoint determinator 90. Combiner means 108 combines, such as by adding or subtracting as selected (+/−), the value of the x-component $X_{bp}$ data of the breakpoint with the actual deviation $dx_{act}$ data from scaler 106 to form the x-component $X_{nv}$ data of the coordinates of the new vertex 18-1 or 18-2 (FIG. 2). The output of combiner means 108, which constitutes a data output of deviation circuitry 100 and has the x-coordinate $X_{nv}$ data of the new vertex, is connected to a data input of geometry processor 70. Analogous circuitry is available in deviation circuitry 100 for producing the y-coordinate $Y_{nv}$ data and z-coordinate $Z_{nv}$ data for new vertex 18-1 or 18-2 (FIG. 2) which are supplied to geometry processor 70.

Figure 6:
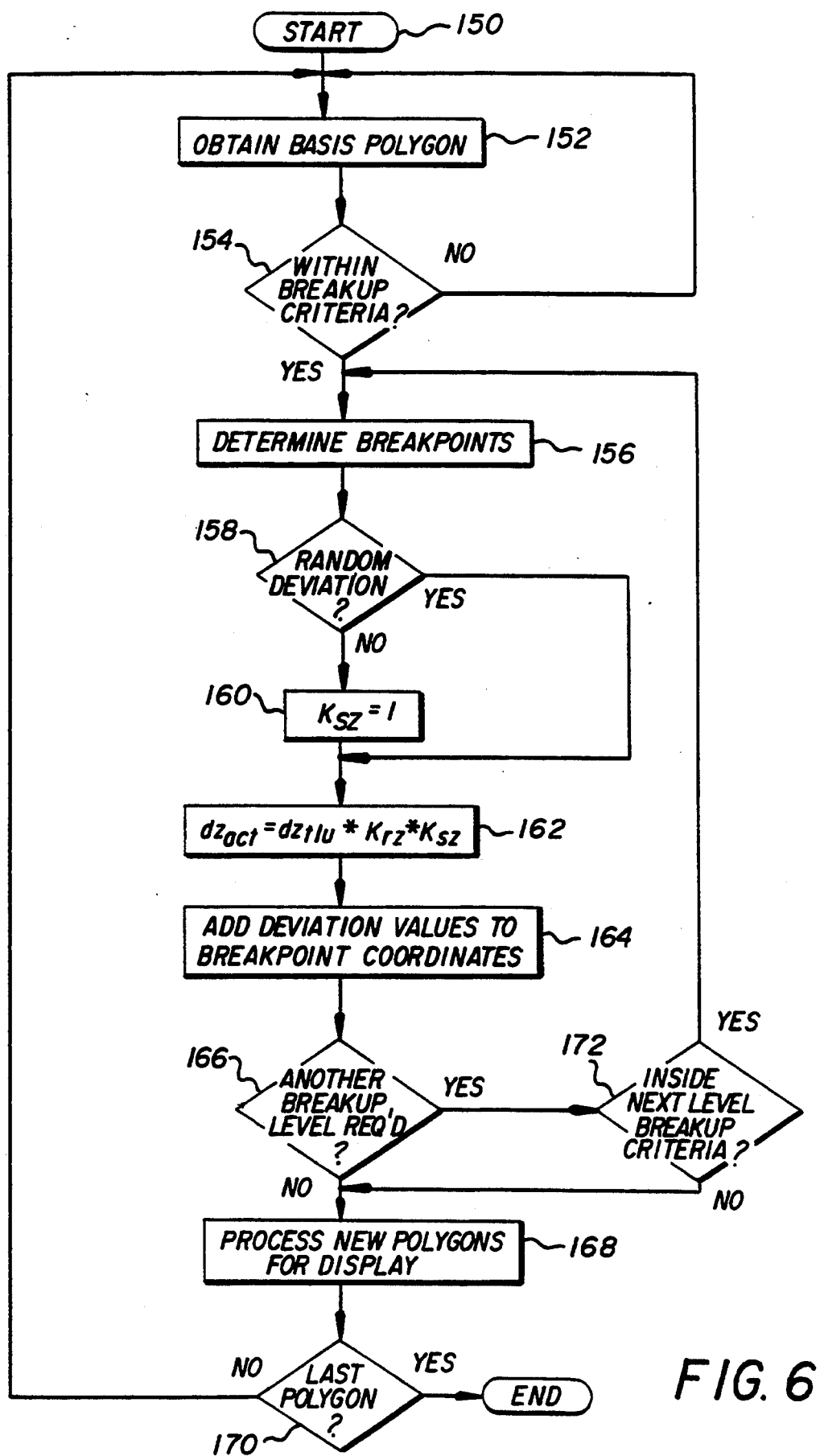
FIG. 6 is a logic flow diagram of a computer program useful with the present invention.

Referring to FIG. 6, a flow diagram useful for programming a general purpose computer in accordance with the present invention is shown. The program begins at step 150 and executes step 152 to obtain the digital data the vertices of the basis polygon. Performance of step 154 determines if the basis polygon is within the functional range, i.e. within the range zone wherein augmentation is to be carried out by providing a breakpoint on at least one edge. If it is not, the program returns to step 152. If the polygon is within the functional range, the execution of step 156 determines the breakpoint data for each side of the basis polygon.

Performance of step 158 determines if random deviation is to be used. If it is not to be used, then the factor $K_{sz}$ is set equal to one (along with the factors $K_{sx}$ and $K_{sy}$, which are also set equal to one but have not been included in the figure to avoid undue clutter) in step 160 and the method then proceeds to step 162. If random deviation is used, the program proceeds directly from step 158 to step 162. Execution of step 162 determines the z-coordinate deviation $dz_{act}$ data of the new vertex 18-1 or 18-2 (FIG. 2). The x- and y-coordinates of a new vertex are determined analogously to z-coordinate $dz_{act}$ data but are not illustrated to avoid undue clutter. Performance of step 164 adds the deviation value data determined by execution of step 162 to the breakpoint coordinate data determined at step 156, in order to obtain the new vertex coordinate data.

Execution of step 166 determines if another breakup level of the sides of the polygons defined by the vertices determined at step 164 for creating finer detail is required, as by the polygon-viewpoint distance having decreased sufficiently so that the polygon is now in a nearer range zone. If the determination of step 166 is negative, then step 168 is performed to process the data for the new polygons for display, and execution of step 170 determines if the basis polygon data being processed is the last item of polygon data to be processed; if it is the last polygon, the program ends. If it is not the last polygon, the program returns to step 152, to repeat steps 152 - 170 as described above and step 172, if required, as described below.

If another breakup level is required responsive to step 166 being performed, then execution of step 172 determines if the involved polygon (basis or derived) is within the next level (closer) range ring from the range of step 154. If it is not, then step 168 is performed and processing proceeds as described above. If the basis polygon is within the next level range ring when step 172 is performed, then step 156 is re-executed to determine the augmented, additional breakpoint data for the polygon defined by the vertices determined at the last performance of step 164. Steps 156-172 are repeated as required until testing at step 170 indicates that the last polygon has been processed.

Thus has been illustrated and described a method for eliminating position, attitude and collision ambiguities, bleedthrough effects, subpixel processing inefficiencies caused by having multiple polygon groups representing a single object, and other deficiencies that may be associated with prior CIG systems caused by LOD transitions during image presentation. Also shown and described is a method for creating finer detail from predefined coarser data without having to predefine and/or store most of the finer detail and without resort to translucency blending for achieving smooth LOD transition. A method for achieving continuous and smooth LOD transition by generating finer detail than is available from predefined data without having to predefine and/or store the finer detail is also illustrated and described.

While certain presently preferred features of our invention are illustrated, many modifications and variations will now occur to those skilled in the art. It is our intent to be limited only by the scope of the appended claims and not by the details and instrumentalities described herein by way of example.

What is claimed is:

1. In a computer image generation system wherein object features of a displayed terrain image are formed from vertex data signals each representing one of a plurality of vertices each designating end points of sides of one of a plurality of planar object face polygons, a method for augmenting the total number of polygon vertices so that finer detail for the features may be displayed in any viewable scene while effecting substantially continuous smooth level-of-detail (LOD) transition, comprising the steps of:
   (a) storing information describing
      (1) vertex descriptors of edges of planar face polygons forming the object features displayable in a scene of lowest LOD,
      (2) breakpoint-determination criteria, and (3) breakpoint geometric attributes;
(b) retrieving from storage information identifying a selected plurality of vertices, and generating therefrom a plurality of corresponding sides interconnecting the vertices, of each of a plurality of planar basis object face polygons each representing a portion of viewable terrain;
(c) locating at least one breakpoint lying on a corresponding side in each of at least one basis polygon selected from the plurality of object face polygons;
(d) combining the at least one breakpoint location information and selected breakpoint geometric attribute information to substantially continuously modify a geometric attribute determining a location of a derived vertex which lies outside the plane of the associated basis polygon by a deviation amount responsive to a preselected function of the location of the associated basis polygon with respect to first and second edges of a range of distances, and with the derived vertex being different from any vertex stored as a descriptor for an object edge, only if the associated basis polygon is within a preselected range of distances from an image observer viewpoint;
(e) selecting desired ones of a set of the unmodified basis polygon vertices and the derived vertices to constitute a set of a plurality of augmented vertices for the associated basis polygon;
(f) forming at least one derived planar polygon by connecting in a predetermined direction at least selected ones of the totality of the augmented set of vertices;
(g) providing the at least one derived polygon as part of the created and displayed terrain image; and
(h) repeating the operation of steps (b)–(g) to incorporate at least one derived polygon in each scene, and cause a succession of scenes to have varying deviation in the derived polygons of that scene to be viewable with substantially continuous smooth LOD transition of increasingly finer feature detail within decreasing ranges of distance to the observer's viewpoint.

2. The method of claim 1, wherein each polygon is a triangle.

3. The method of claim 1, wherein the breakpoints and the derived vertices are described in a mutually-orthogonal three-axis system, and step (d) includes the steps of:
(d1) obtaining deviation value data for each breakpoint; and
(d2) combining deviation value data obtained for a particular breakpoint with data for an axis coordinate of the breakpoint to obtain data establishing the actual coordinate of the derived vertex along that same axis.

4. The method of claim 3, wherein the combining step (d2) includes the step of adding an associated deviation data value to each of at least one different one of the three axial data values of the orthogonal three-axis system used to identify breakpoint position.

5. The method of claim 3, wherein the combining step (d2) includes the step of subtracting an associated deviation data value from each of at least one different one of the three axial data values of the orthogonal three-axis system used to identify breakpoint position.

6. The method of claim 3, wherein the deviation value data is selected from the group consisting of:
predetermined constant values;
random values;
predetermined sinusoidal values;
other predetermined periodic values;
terrain geospecific values;
and a combination of these values.

7. The method of claim 1, wherein step (c) includes the step of designating each different breakpoint to be at a predetermined distance along a different preselected side extending from an associated preselected vertex c,f the basis polygon.

8. The method of claim 7, wherein the predetermined distance is selected from the group consisting of:
one-half the length of the corresponding side;
a predetermined constant distance; a random distance;
and a combination of these distances.

9. The method of claim 1, wherein
step (c) further includes the step (c') of processing the total data to determine other breakpoints, each other breakpoint lying on a corresponding side of the derived polygon;
step (d) further includes the step (d') of substantially continuously modifying data for at least one of the other breakpoints to form data designating another derived vertex which lies outside the plane of both the derived polygon and the basis polygon; and
step (e) further includes the step (e') of including the other derived vertex data in the augmented vertex data to be processed in step (f).

10. The method of claim 9, wherein
step (c) is performed only when the basis polygon is within a first predetermined distance from the viewpoint; and the
step (c') of processing data to determine other breakpoints is performed only when the involved polygon is within a second predetermined distance, closer to the viewpoint than the first predetermined distance.

11. The method of claim 1, wherein step (c) is performed only when the basis polygon is within a predetermined distance from the viewpoint.

12. The method of claim 1, wherein
step (c) further includes the step of determining said at least one breakpoint only when an angle between a boresight of a view window and a view ray to the involved polygon, both with respect to the viewpoint, is within a predetermined limit.

13. In a computer image generation system wherein object features of a display image are formed by first planar polygons, each having a plurality of first vertices each designating one end point of each side of one of the first polygons, a method for achieving substantially continuous smooth level of detail transition, comprising the steps of:
(a) retrieving from storage data determining each of the first vertices of each of the first polygons;
(b) separating each of at least some of the first polygons into a plurality of planar second polygons, each smaller than the associated first polygon, with each second polygon having at least one second vertex which is located at a juncture formed by two sides of that second polygon and with each second vertex being different from any one of the first vertices;
(c) locating, for at least one selected one of the second vertices, a corresponding derived third vertex lying some deviational amount outside the common plane of the associated first and second polygons and different from any of the stored first vertices;

(d) displaying at least one derived planar polygon, each defined by a different combination of one of a third vertex determined in step (c) and associated ones of the first and second vertices, to create and display at least some of a sequence of scenes of a viewable image; and (e) varying the deviational amount in a manner to display scenes having an increasing level of detail as a viewpoint nears a polygon location, and with a substantially continuous smooth level of detail transition.

14. The method of claim 13, wherein each second vertex has an elevation component associated therewith, and step (c) includes the step of locating at least one of the third vertices such that the elevation data component of that third vertex is different from the elevation data component of its associated second vertex.

15. The method of claim 14, wherein the elevation data component of the selected third vertex is greater than the elevation data component of its associated second vertex.

16. The method of claim 14, wherein the elevation data component of the selected third vertex is less than the elevation data component of its associated second vertex.

17. The method of claim 13, wherein step (b) includes the step of breaking up at least some of the first polygons into second polygons only when an angle, between an image viewpoint and both a boresight of a view window and a view ray to that one of the first polygons, is within a predetermined limit.

18. In a computer image generation system wherein object features of an image to be displayed are represented by planar basis polygons having vertices designating end points of each of a plurality of sides of the basis polygons, a method for augmenting a total number of vertices to cause an increased number of total polygons, each with finer detail for the object features, to be displayed with substantially continuous smooth level of detail transition in viewable scenes created by the system, comprising the steps of:

(a) retrieving from storage vertex data defining each of a plurality of the basis polygons;

(b) selecting a point lying within each of at least one selected one of the basis polygons and different from any vertex of the associated basis polygon;

(c) locating a derived vertex lying at a deviation distance outside the plane of the associated basis polygon at the selected point and different from any of the stored basis polygon vertices;

(d) forming at least one derived polygon determined by the derived vertex and at least two adjacent vertices of the associated basis polygon, responsive to the location of the associated basis polygon nearing an observer viewpoint in the image; and (e) displaying the derived polygon as part of the viewable image of a scene having finer feature detail along with substantially continuous smooth level of detail transition as the polygon location distance to the viewpoint decreases.

19. The method of claim 18, wherein step (e) includes the steps of:

forming a plurality of derived polygons each including the derived vertex and a side of the associated basis polygon, with the plurality of derived polygons equal in number to the number of sides of the basis polygon;

and displaying the plurality of derived polygons to obtain the display image.

20. The method of claim 18, wherein step (b) further includes the step of selecting each basis polygon point only when an angle, formed between the image viewpoint and both a boresight of a view window and a view ray to the basis polygon, is within a predetermined limit.

* * * * *